(12) United States Patent
Jeong et al.

(10) Patent No.: US 9,243,168 B2
(45) Date of Patent: Jan. 26, 2016

(54) ADHESIVE COMPOSITION AND OPTICAL MEMBER USING THE SAME

(75) Inventors: Woo Jin Jeong, Uiwang-si (KR); Hee Yeon Ki, Uiwang-si (KR); Hae Ryong Chung, Uiwang-si (KR)

(73) Assignee: CHEIL INDUSTRIES, INC., Gumi-si, Gyeongsangbuk-do (KR)

(*) Notice: Subject to any disclaimer, the term of this patent is extended or adjusted under 35 U.S.C. 154(b) by 493 days.

(21) Appl. No.: 12/965,293

(22) Filed: Dec. 10, 2010

(65) Prior Publication Data

US 2011/0143135 A1 Jun. 16, 2011

(30) Foreign Application Priority Data

Dec. 14, 2009 (KR) .................. 10-2009-0124188

(51) Int. Cl.
| | | |
|---|---|---|
| C09J 133/08 | (2006.01) | |
| C09J 133/10 | (2006.01) | |
| C09J 7/02 | (2006.01) | |
| C08K 5/5415 | (2006.01) | |
| C08K 5/29 | (2006.01) | |
| C08K 5/00 | (2006.01) | |
| C08K 5/5425 | (2006.01) | |
| C08K 5/5465 | (2006.01) | |

(52) U.S. Cl.
CPC .............. C09J 7/0217 (2013.01); C08K 5/29 (2013.01); C09J 133/08 (2013.01); C09J 133/10 (2013.01); C08K 5/0025 (2013.01); C08K 5/5425 (2013.01); C08K 5/5465 (2013.01); C09J 2203/318 (2013.01); C09J 2205/102 (2013.01); Y10T 428/2891 (2015.01)

(58) Field of Classification Search
None
See application file for complete search history.

(56) References Cited

U.S. PATENT DOCUMENTS

| | | | | |
|---|---|---|---|---|
| 5,194,550 | A * | 3/1993 | Rance et al. | 526/318.25 |
| 5,795,650 | A | 8/1998 | Watanabe et al. | |
| 6,177,173 | B1 * | 1/2001 | Nelson | 428/137 |
| 6,353,066 | B1 * | 3/2002 | Sosa | 526/224 |
| 6,432,475 | B1 * | 8/2002 | Yamamoto et al. | 427/208.4 |
| 6,447,900 | B1 * | 9/2002 | Ohtani et al. | 428/355 AC |
| 6,630,239 | B2 * | 10/2003 | Cernohous et al. | 428/355 R |
| 6,683,120 | B2 * | 1/2004 | Munro | 523/111 |
| 7,070,051 | B2 * | 7/2006 | Kanner et al. | 206/382 |
| 2001/0019766 | A1 * | 9/2001 | Masuda et al. | 428/345 |
| 2003/0008139 | A1 * | 1/2003 | Nagamoto et al. | 428/345 |

(Continued)

FOREIGN PATENT DOCUMENTS

| | | |
|---|---|---|
| CN | 101595193 B | 3/2012 |
| JP | 03-272921 B2 | 4/2002 |

(Continued)

OTHER PUBLICATIONS

Polymer Data Sheet (2013).*

(Continued)

*Primary Examiner* — Frank D Ducheneaux
(74) *Attorney, Agent, or Firm* — Lee & Morse, P.C.

(57) ABSTRACT

An adhesive composition and an optical member using the same, the adhesive composition including about 100 parts by weight of a (meth)acrylate copolymer including repeating units derived from a $C_{1-20}$ alkyl(meth)acrylate monomer, an aromatic group-containing monomer, and a carboxyl group-containing monomer; about 0.01 to about 10 parts by weight of a crosslinking agent; about 0.01 to about 5 parts by weight of a silane coupling agent; and about 0.01 to about 5 parts by weight of a crosslinking catalyst.

15 Claims, 1 Drawing Sheet

(56) References Cited

U.S. PATENT DOCUMENTS

| | | |
|---|---|---|
| 2003/0017332 A1* | 1/2003 | Takizawa et al. ............. 428/343 |
| 2003/0216519 A1* | 11/2003 | Heilmann et al. ............. 525/191 |
| 2003/0232192 A1* | 12/2003 | Kishioka et al. ............. 428/354 |
| 2005/0261433 A1* | 11/2005 | Takeko et al. ................ 525/222 |
| 2006/0057366 A1* | 3/2006 | Husemann et al. ........... 428/343 |
| 2006/0134362 A1* | 6/2006 | Lu et al. ....................... 428/40.1 |
| 2006/0142445 A1* | 6/2006 | Soerens et al. ................ 524/236 |
| 2007/0036930 A1* | 2/2007 | Kontani et al. ............... 428/40.1 |
| 2007/0166537 A1* | 7/2007 | Nagamoto et al. ...... 428/355 AC |
| 2007/0218276 A1* | 9/2007 | Hiramatsu et al. ............ 428/354 |
| 2008/0023132 A1* | 1/2008 | Sano et al. .................. 156/275.7 |
| 2010/0124627 A1* | 5/2010 | Nonaka et al. ............... 428/41.8 |
| 2010/0183872 A1* | 7/2010 | Nonaka et al. ............... 428/336 |
| 2010/0208343 A1* | 8/2010 | Yoshida et al. ............... 359/485 |
| 2010/0209649 A1* | 8/2010 | Kuwahara et al. ........... 428/41.3 |

FOREIGN PATENT DOCUMENTS

| | | |
|---|---|---|
| JP | 2006-063189 A | 3/2006 |
| KR | 10 2003-0069461 A | 8/2003 |
| WO | WO 03/070849 A1 | 8/2003 |
| WO | WO 2009008470 A1 * | 1/2009 |
| WO | WO 2009028374 A1 * | 3/2009 |

OTHER PUBLICATIONS

Chinese First Office Action in CN 201010599751.1, dated Jun. 5, 2012 (Jeong, et al.).

Korean Office Action in KR 10-2010-0127235, dated Nov. 27, 2013 (Jeong, et al.).

* cited by examiner

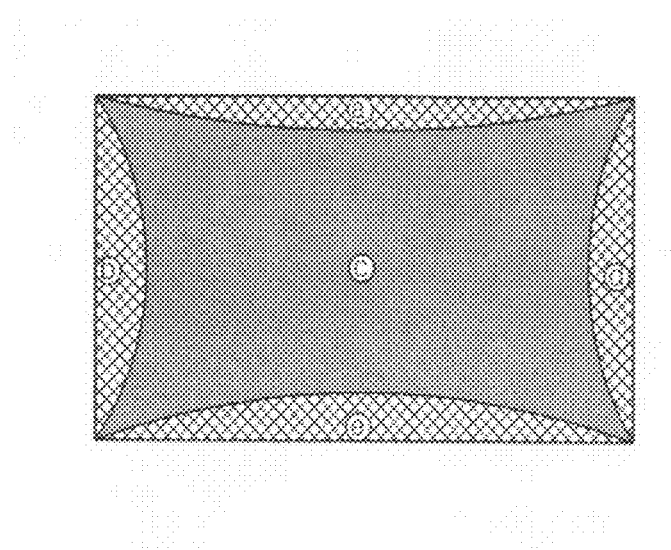

ADHESIVE COMPOSITION AND OPTICAL MEMBER USING THE SAME

FIELD

Embodiments relate to an adhesive composition and an optical member using the same.

DESCRIPTION OF THE RELATED ART

Optical films may include a polarizer plate, color filter, phase difference film, elliptic polarization film, reflective film, anti-reflective film, compensation film, brightness-improving film, alignment film, diffusion film, shatter preventing film, surface-protective film, plastic LCD substrate, and the like. Optical films may be used in various optical members, e.g., LCD display devices.

SUMMARY

Embodiments are directed to an adhesive composition and an optical member using the same.

The embodiments may be realized by providing an adhesive composition including about 100 parts by weight of a (meth)acrylate copolymer including repeating units derived from a $C_{1-20}$ alkyl(meth)acrylate monomer, an aromatic group-containing monomer, and a carboxyl group-containing monomer; about 0.01 to about 10 parts by weight of a crosslinking agent; about 0.01 to about 5 parts by weight of a silane coupling agent; and about 0.01 to about 5 parts by weight of a crosslinking catalyst, wherein the adhesive composition provides an adhesive having a gel fraction of about 85% or more as defined by Equation 1:

$$\text{Gel fraction}(\%)=(A/B)\times 100, \quad [\text{Equation 1}]$$

in Equation 1, A is a mass measured after dissolving the adhesive at 23° C. for 48 hours using a solvent and then drying for 24 hours, and B is an initial mass.

The (meth)acrylate copolymer may further include repeating units derived from a hydroxy group-containing monomer.

The (meth)acrylate copolymer may include about 50 to about 90 wt % of the repeating units derived from the $C_{1-20}$ alkyl(meth)acrylate monomer, about 0.01 to about 30 wt % of the repeating units derived from the aromatic group-containing monomer, about 10 wt % or less of the repeating units derived from the hydroxy group-containing monomer, and about 0.01 to about 10 wt % of the repeating units derived from the carboxyl group-containing monomer.

The aromatic group-containing monomer may have positive birefringence.

The crosslinking agent may include a combination of an isocyanate crosslinking agent and an epoxy crosslinking agent.

The crosslinking agent may include a mixture of about 60 to about 90 wt % of the isocyanate crosslinking agent and about 10 to about 40 wt % of the epoxy crosslinking agent.

The crosslinking catalyst may include an amine compound, an organometallic compound, or a combination thereof.

The amine compound may include at least one of trimethylaminoethylethanolamine, N,N,N',N'-tetramethylhexanediamine, triethylamine, and imidazole, and the organometallic compound may include at least one of cobalt naphthenate, dibutyltin diacetate, dibutyltin diacetylacetonate, tetra-n-butyltin, trimethyltin hydroxide, and dibutyltin dilaurate.

The adhesive composition may provide an adhesive having a storage elasticity of about 0.2 to about 0.5 MPa at 23° C.

The adhesive composition may provide an adhesive having a storage elasticity of about 0.25 to about 0.4 MPa at 23° C.

The crosslinking agent may be present in an amount of about 0.1 to about 10 wt % with respect to a total weight of the adhesive composition.

The embodiments may also be realized by providing an adhesive composition including a (meth)acrylate copolymer including repeating units derived from a $C_{1-20}$ alkyl(meth)acrylate monomer, an aromatic group-containing monomer, and a carboxyl group-containing monomer; an epoxy crosslinking agent and an isocyanate crosslinking agent; a silane coupling agent; and a crosslinking catalyst, wherein the adhesive composition provides an adhesive having a gel fraction of about 85% or more as defined by Equation 1:

$$\text{Gel fraction}(\%)=(A/B)\times 100, \quad [\text{Equation 1}]$$

in Equation 1, A is a mass measured after dissolving the adhesive at 23° C. for 48 hours using a solvent and then drying for 24 hours, and B is an initial mass.

The (meth)acrylate copolymer may further include repeating units derived from a hydroxy group-containing monomer.

The (meth)acrylate copolymer may include about 50 to about 90 wt % of the repeating units derived from the $C_{1-20}$ alkyl(meth)acrylate monomer, about 0.01 to about 30 wt % of the repeating units derived from the aromatic group-containing monomer, about 10 wt % or less of the repeating units derived from the hydroxy group-containing monomer, and about 0.01 to about 10 wt % of the repeating units derived from the carboxyl group-containing monomer.

The adhesive composition may include about 100 parts by weight of the (meth)acrylate copolymer; about 0.01 to about 10 parts by weight of the crosslinking agent; about 0.01 to about 5 parts by weight of the silane coupling agent; and about 0.01 to about 5 parts by weight of the crosslinking catalyst.

The crosslinking agent may include a mixture of about 60 to about 90 wt % of the isocyanate crosslinking agent and about 10 to about 40 wt % of the epoxy crosslinking agent.

The crosslinking catalyst may include an amine compound, an organometallic compound, or a combination thereof.

The adhesive composition may provide an adhesive having a storage elasticity of about 0.2 to about 0.5 MPa at 23° C.

The embodiments may also be realized by providing an optical member including an optical film; and an adhesive sheet on one or both sides of the optical film, the adhesive sheet being formed from the adhesive composition according to an embodiment.

The optical member may have a brightness difference $\Delta L$ of about 0.5 or less between edge portions thereof and a center portion thereof, the brightness difference $\Delta L$ being defined by the following Equation 2:

$$\Delta L=[(a+b+d+e)/4]-c, \quad [\text{Equation 2}]$$

in Equation 2, a, b, d, and e are brightnesses at the edge portions, and c is a brightness at the center portion.

BRIEF DESCRIPTION OF THE DRAWINGS

The embodiments will become more apparent to those of ordinary skill in the art by describing in detail exemplary embodiments with reference to the attached drawing, in which:

FIG. 1 illustrates a plan view of an LCD device showing measurement points for determining brightness.

DETAILED DESCRIPTION

Korean Patent Application No. 10-2009-0124188, filed on Dec. 14, 2009, in the Korean Intellectual Property Office, and entitled: "Adhesive Composition and Optical Member Using the Same," is incorporated by reference herein in its entirety.

Example embodiments will now be described so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present. Like reference numerals refer to like elements throughout. As used herein, the term "room temperature" maybe used to refer to a temperature of about 20-25° C., e.g., about 23° C., and may be used interchangeably therewith. As used herein, the term "parts by weight" may be used to refer to a unit of weight measurement, e.g., grams (g), kilograms (kg), ounces (oz), pounds (lb), etc. For example, where a composition is composed of 60 parts by weight of component A and 70 parts by weight of component B, the composition may have a total weight of 130 g, 130 kg, 130 oz, 130 lb, etc.

An embodiment provides an adhesive composition. The adhesive composition may include, e.g., a (meth)acrylate copolymer prepared by polymerization of a monomer mixture including a $C_{1-20}$ alkyl(meth)acrylate monomer, an aromatic group-containing monomer, and a carboxyl group-containing monomer; a crosslinking agent; a silane coupling agent; and a crosslinking catalyst.

(Meth)Acrylate Copolymer

In an embodiment, the (meth)acrylate copolymer may be prepared by polymerization of a monomer mixture including a $C_{1-20}$ alkyl(meth)acrylate monomer, an aromatic group-containing monomer, and a carboxyl group-containing monomer. For example, the (meth)acrylate copolymer may include repeating units derived from the $C_{1-20}$ alkyl(meth)acrylate monomer, the aromatic group-containing monomer, and the carboxyl group-containing monomer.

In an implementation, the (meth)acrylate copolymer may be prepared by polymerization of a monomer mixture including the $C_{1-20}$ alkyl(meth)acrylate monomer, the aromatic group-containing monomer, a hydroxy group-containing monomer, and the carboxyl group-containing monomer. For example, the (meth)acrylate copolymer may include repeating units derived from the $C_{1-20}$ alkyl(meth)acrylate monomer, the aromatic group-containing monomer, the hydroxy group-containing monomer, and the carboxyl group-containing monomer.

The (meth)acrylate copolymer may include about 50 to about 90 wt % of the repeating units derived from the $C_{1-20}$ alkyl(meth)acrylate monomer, about 0.01 to about 30 wt % of the repeating units derived from the aromatic group-containing monomer, about 10 wt % or less of the repeating units derived from the hydroxy group-containing monomer, and about 0.01 to about 10 wt % of the repeating units derived from the carboxyl group-containing monomer, based on a total weight of the monomers or monomer components.

In an implementation, the (meth)acrylate copolymer may include about 65 to about 85 wt % of the repeating units derived from the $C_{1-20}$ alkyl(meth)acrylate monomer, about 1 to about 20 wt % of the repeating units derived from the aromatic group-containing monomer, about 0.5 to about 7.5 wt % of the repeating units derived from the hydroxy group-containing monomer, and about 1 to about 7.5 wt % of the repeating units derived from the carboxyl group-containing monomer, based on a total weight of the monomer components.

The $C_{1-20}$ alkyl(meth)acrylate monomer may include, e.g., methyl(meth)acrylate, ethyl(meth)acrylate, propyl(meth) acrylate, butyl(meth)acrylate, pentyl(meth)acrylate, hexyl (meth)acrylate, heptyl(meth)acrylate, octyl(meth)acrylate, nonyl(meth)acrylate, decyl(meth)acrylate, dodecyl(meth) acrylate, lauryl(meth)acrylate, or the like. These monomers may be used alone or in combination of two or more kinds thereof. Herein, (meth)acrylate includes both acrylate and methacrylate.

The aromatic group-containing monomer may be a monomer having positive birefringence. The aromatic group-containing monomer may be a (meth)acrylate that contains an aromatic group. In an implementation, the aromatic group-containing monomer may be a compound represented by Chemical Formula 1 or 2, below, or a mixture thereof:

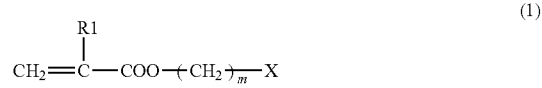

(1)

In Chemical Formula 1, R1 may be hydrogen or methyl, m may be an integer from 0 to about 10, and X may include at least one of phenyl, methylphenyl, methylethylphenyl, propylphenyl, methoxyphenyl, cyclohexylphenyl, chlorophenyl, bromophenyl, phenylphenyl, and benzylphenyl.

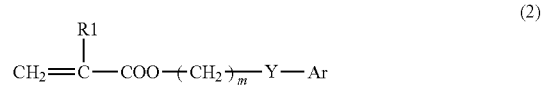

(2)

In Chemical Formula 2, R2 may be hydrogen or methyl, m may be an integer from 0 to about 10, Y may be oxygen (O) or sulfur (S), and Ar may include at least one of phenyl, methylphenyl, methylethylphenyl, methoxyphenyl, cyclohexylphenyl, chlorophenyl, bromophenyl, phenylphenyl, and benzylphenyl.

Examples of the compounds represented by Chemical Formula 1 or 2 may include, but are not limited to, a (meth) acrylate such as 2-ethylphenoxy(meth)acrylate, 2-ethylthiophenyl(meth)acrylate, phenyl(meth)acrylate, benzyl(meth) acrylate, 2-phenylethyl(meth)acrylate, 3-phenylpropyl (meth)acrylate, 4-phenylbutyl(meth)acrylate, 2-2-methylphenylethyl(meth)acrylate, 2-3-methylphenylethyl (meth)acrylate, 2-4-methylphenylethyl(meth)acrylate, 2-(4-propylphenyl)ethyl(meth)acrylate, 2-(4-(1-methylethyl) phenyl)ethyl(meth)acrylate, 2-(4-methoxyphenyl)ethyl (meth)acrylate, 2-(4-cyclohexylphenyl)ethyl(meth)acrylate, 2-(2-chlorophenyl)ethyl(meth)acrylate, 2-(3-chlorophenyl) ethyl(meth)acrylate, 2-(4-chlorophenyl)ethyl(meth)acrylate, 2-(4-bromophenyl)ethyl(meth)acrylate, 2-(3-phenylphenyl) ethyl(meth)acrylate, and/or 2-(4-benzylphenyl)ethyl(meth) acrylate. These compounds may be used alone or in combination of two or more kinds thereof. In an implementation, the aromatic group-containing monomer may include, e.g., phenoxydiethylene glycol(meth)acrylate, ethylene oxide-modified nonylphenol(meth)acrylate, hydroxyethylated β-naphthol acrylate, biphenyl(meth)acrylate, styrene, vinyltoluene, α-methylstyrene, and the like.

As described above, the repeating units derived from the aromatic group-containing monomer may be included in the (meth)acrylate copolymer in an amount of about 0.01 to about 30 wt %, based on the total weight of the monomer components. Maintaining the amount of repeating units derived from the aromatic group-containing monomer at about 0.01 to about 30 wt % may help prevent excessive initial peeling force, durability problems, and light leakage. As described above, in an implementation, the repeating units derived from the aromatic group-containing monomer may be included in an amount of about 1 to about 20 wt %.

Examples of the hydroxy group-containing monomer may include, but are not limited to, 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanediethanol mono(meth)acrylate, chloro-2-hydroxypropylacrylate, diethylene glycol mono (meth)acrylate, allyl alcohol, and the like. In an implementation, the hydroxy group-containing monomer may be a (meth)acrylate that contains a hydroxy group. The repeating units derived from the hydroxy group-containing monomer may be included in an amount of about 10 wt % or less, based on the total weight of monomer components. Preferably, the repeating units derived from the hydroxy group-containing monomer may be included in an amount of about 0.5 to about 10 wt %, and more preferably about 0.5 to about 7.5 wt %.

Examples of the carboxyl group-containing monomer may include (meth)acrylic acid, 2-carboxyethyl(meth)acrylate, 3-carboxypropyl(meth)acrylate, 4-carboxybutyl(meth)acrylate, itaconic acid, crotonic acid, maleic acid, fumaric acid, maleic anhydride, or the like. In an implementation, the carboxyl group-containing monomer may be a (meth)acrylate that contains an additional carboxyl group. The repeating units derived from the carboxyl group-containing monomer may be included in an amount of about 0.01 to about 10 wt %, preferably about 1 to about 7.5 wt %, based on the total weight of monomer components.

Crosslinking Agent

The crosslinking agent may include, e.g., a combination of an isocyanate crosslinking agent and an epoxy crosslinking agent. In an implementation, the crosslinking agent may include a mixture of about 60 to about 90 wt % of the isocyanate crosslinking agent and about 10 to about 40 wt % of the epoxy crosslinking agent. In another implementation, the crosslinking agent may include a mixture of about 70 to about 90 wt % of the isocyanate crosslinking agent and about 10 to about 30 wt % of the epoxy crosslinking agent.

The isocyanate crosslinking agent may include, e.g., toluene diisocyanate, xylene diisocyanate, diphenylmethane diisocyanate, hexamethylene diisocyanate, isoform diisocyanate, tetramethylxylene diisocyanate, naphthalene diisocyanate, and/or polyols thereof (e.g., trimethylolpropane), but is not necessarily limited thereto. These may be used alone or in combination of two or more kinds thereof.

The epoxy crosslinking agent may include, e.g., ethylene glycol diglycidyl ether, triglycidyl ether, trimethylolpropane triglycidyl ether, N,N,N'N'-tetraglycidylethylenediamine, glycerine diglycidyl ether, or the like, but is not necessarily limited thereto. These may be used alone or in combination of two or more kinds thereof.

The crosslinking agent may be included in an amount of about 0.01 to about 10 parts by weight, preferably about 0.1 to about 7 parts by weight, more preferably about 0.3 to about 5 parts by weight, and still more preferably about 0.5 to about 3 parts by weight, based on 100 parts by weight of the (meth) acrylate copolymer.

In an implementation, the crosslinking agent may be included in an amount of about 0.1 to about 10 wt %, preferably about 0.3 to about 5 wt %, based on an entire weight of the adhesive composition. Maintaining the amount of the crosslinking agent at about 0.1 to about 10 wt % may help ensure that a gel fraction of about 85% or more as well as superior peel strength is attained.

Silane Coupling Agent

The silane coupling agent may be included to further improve adhesion stability and adhesion reliability.

The silane coupling agent may include, e.g., γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane, γ-acetoacetatepropyltrimethoxysilane, or the like. The silane coupling agent may be used alone or in combination of two or more kinds thereof.

The silane coupling agent may be included in an amount of about 0.01 to about 5 parts by weight, preferably about 0.05 to about 1 part by weight, and more preferably about 0.07 to about 0.5 parts by weight, based on 100 parts by weight of the (meth)acrylate copolymer. Maintaining the amount of the silane coupling agent at about 0.01 to about 5 parts by weight may help ensure that adhesion stability and adhesion reliability are improved.

Crosslinking Catalyst

The crosslinking catalyst may be included to boost a reaction rate by about 10 to about 100 times.

To form a backbone of the (meth)acrylate copolymer, monomers having functional groups may be used, e.g., the $C_{1-20}$ alkyl(meth)acrylate monomer, the aromatic group-containing monomer, a hydroxy group-containing monomer, and the carboxyl group-containing monomer. The monomers having the functional groups may be crosslinked by the crosslinking agent. Involved reactions may proceed with different reaction rates. By adequately controlling the reaction rates, e.g., by using a crosslinking catalyst, a 3-dimensional matrix may be attained, as opposed to a typical linear polymer structure.

An adhesive for a polarizer plate may require aging, during which time curing, e.g., bonding or crosslinking, may occur. Curing or bonding may proceed most rapidly between isocyanate and hydroxyl groups, followed by isocyanate and water, isocyanate and carboxyl groups, and epoxy and carboxyl groups, in that order. By adding the crosslinking catalyst, curing, e.g., bonding or cross-linking between function groups of the monomers, may be triggered at specific times.

Through this control, a 3-dimensional matrix may be formed; and elasticity of the adhesive may be improved. As a result, a display device with improved light leakage characteristics may be provided.

The crosslinking catalyst may include, e.g., an amine compound, an organometallic compound, or a combination thereof. In an implementation, the amine compound may include, e.g., trimethylaminoethylethanolamine, N,N,N',N'-tetramethylhexanediamine, triethylamine, imidazole, or the like, but is not necessarily limited thereto. These may be used alone or in combination of two or more kinds thereof. The organometallic compound may include, e.g., cobalt naphthenate, dibutyltin diacetate, dibutyltin diacetylacetonate, tetra-n-butyltin, trimethyltin hydroxide, dibutyltin dilaurate, or the like, but is not necessarily limited thereto. These may be used alone or in combination of two or more kinds thereof A Sn-based catalyst may be used to minimize yellowing. In an implementation, the crosslinking catalyst may include an organometallic catalyst and an organic amine catalyst, which may trigger crosslinking at specific times.

The crosslinking catalyst may be included in an amount of about 0.01 to about 5 parts by weight, preferably about 0.01 to about 1 part by weight, and more preferably about 0.03 to about 0.1 parts by weight, based on 100 parts by weight of the (meth)acrylate copolymer. Maintaining the amount of the crosslinking catalyst at about 0.01 to about 5 parts by weight may help prevent change of physical properties over time as well as prevent edge curling and reliability problems.

Additives

In an implementation, the adhesive composition may further include additives, e.g., a UV stabilizer, an antioxidant, a coloring agent, a reinforcing agent, fillers, an anti-foaming agent, a surfactant, a plasticizer, and the like.

A method of preparing the adhesive composition is not particularly limited. In an implementation, the adhesive composition may be prepared by uniformly mixing the (meth) acrylate copolymer with a thermal initiator, the crosslinking agent, the silane coupling agent, and the crosslinking catalyst. If desired, a solvent may be added for dilution.

By controlling the curing rate, e.g., controlling the rate of cross-linking between the repeating units of the (meth)acrylate copolymer, the adhesive composition of an embodiment may provide high gel fraction and high elasticity with a semi-IPN structure.

In an implementation, the adhesive composition may provide a gel fraction of about 85% or more as defined by Equation 1:

$$\text{Gel fraction}(\%) = (A/B) \times 100, \qquad \text{[Equation 1]}$$

In Equation 1, A is a mass measured after dissolving the adhesive in a solvent at room temperature, e.g., 23° C., for 48 hours, e.g., using Soxhlet extraction, and then drying for 24 hours, and B is an initial mass.

In an implementation, the adhesive composition may have a gel fraction of about 85 to about 100%, preferably about 90 to about 99.99%, more preferably about 92 to about 99.99%, and still more preferably about 95 to about 99.99%. A gel fraction of about 85 to about 100% may help ensure that light leakage characteristics are improved. For example, when an epoxy crosslinking agent is used, the gel fraction may be further increased.

The adhesive composition prepared as described above may be coated on an optical film and then aged to form an adhesive layer. In an implementation, the adhesive layer may have a storage elasticity G' of about 0.1 MPa or more, preferably about 0.15 MPa or more, more preferably about 0.2 MPa or more, and still more preferably about 0.25 MPa or more, at 23° C. In another implementation, the storage elasticity may be about 0.2 to about 0.5 MPa at about room temperature, e.g., 23° C. In still another implementation, the storage elasticity may be about 0.25 to about 0.4 MPa at room temperature.

Another embodiment provides an optical member using the adhesive composition. The optical member may include an adhesive layer formed from the adhesive composition on one or both sides of an optical film. In the present embodiment, a method of forming the adhesive layer on the optical film is not particularly limited. For example, the adhesive composition may be directly applied to a surface of an optical film and then dried to form the adhesive layer. Alternatively, the adhesive layer may be formed on a releasable substrate and then transferred to the optical film. The adhesive layer may be formed to a thickness of about 10 μm to about 100 μm, and preferably about 20 μm to about 70 μm.

In an implementation, the optical member may have a brightness difference ΔL of about 0.5 or less, preferably about 0.01 to about 0.5, between edge portions of the optical member and a center portion of the optical member, as defined by the Equation 2, below:

$$\Delta L = [(a+b+d+e)/4] - c, \qquad \text{[Equation 2]}$$

In Equation 2, a, b, d, and e are brightnesses at edge portions, and c is a brightness at a center portion.

The optical film may include, e.g., a polarizer plate, a color filter, a phase difference film, an elliptic polarization film, a reflective film, an anti-reflective film, a compensation film, a brightness-improving film, an alignment film, a diffusion film, a shatter preventing film, a surface-protecting film, a plastic LCD substrate, or the like.

Examples and experiments will now be described. The following examples and experiments are given for illustrative purposes only and are not intended to limit the scope of this disclosure. Moreover, the Comparative Examples are set forth to highlight certain characteristics of certain embodiments and are not to be construed as either limiting the scope of the invention as exemplified in the Examples or as necessarily always being outside the scope of the invention in every respect.

EXAMPLES (a) (Meth)Acrylate Copolymer

A copolymer prepared from 100 parts by weight of a monomer mixture including phenyl methacrylate (30 wt %), butyl acrylate (68.9 wt %), 2-hydroxyethyl(meth)acrylate (1%), and acrylic acid (0.1 wt %) by solution polymerization using 0.05 parts by weight of 2,2'-azobisisobutyronitrile (AIBN) was used.

(b) Crosslinking Agent (b1) Trimethylolpropane-modified tolylene diisocyanate (Coronate CORONATE L; Nippon Polyurethane) was used as an isocyanate crosslinking agent.

(b2) Tetrad C TETRAD-C(Mitsubishi Gas Chemical) was used as an epoxy crosslinking agent.

(c) Silane Coupling Agent

3-Glycidoxypropylmethoxysilane (KBM-403; Shin-Etsu Chemical) was used.

(d) Crosslinking Catalyst

DBTDL (Sn; K-Catalyst) was used as an organometallic catalyst.

Examples 1-4 and Comparative Examples 1-2

Parts by weight of the above components were mixed as described in Table 1, below, and, after adding 30 parts by weight of ethyl acetate, were stirred for 20 minutes to obtain a homogenous mixture. The prepared mixture solution was coated on a polarizer plate and then aged for 72 hours. Thereafter, physical properties were evaluated as follows.

Physical Properties (1) Gel fraction: After dissolving 1.0 to 2.0 g of sample in toluene (20 mL) for 48 hours at room temperature (23° C.) and drying for 24 hours, gel fraction was calculated as a percentage of the initial mass, according to Equation 1:

$$\text{Gel fraction}(\%) = (A/B) \times 100, \qquad \text{[Equation 1]}$$

Above, A is the mass of the adhesive measured after dissolving the adhesive sample at room temperature (23° C.) for 48 hours in toluene and then drying for 24 hours, and B is the initial mass of the adhesive.

(2) Appearance: Color and transparency were evaluated through visual inspection.

(3) Peel strength: 180° peeling force between the adhesive and a glass substrate was measured according to JIS 2107. Samples were cut to 25×100 mm and laminated on glass surface. Then, after connecting the adhesive layer and the glass substrate to upper and lower jigs in a 30 kgf load cell using a texture analyzer, load was measured while performing peeling at a tensile speed of 300 mm/min.

(4) Reworkability and cutability: A 400×250 mm polarizer plate coated with the adhesive composition was cut with a Thomson cutter. After observation of the cut cross-section of the adhesive layer, followed by lamination with a glass substrate, a pressure of 4 to 5 kg/cm$^2$ was applied to prepare a sample. After storage at 70° C. for 6 hours and slow cooling to room temperature for over 1 hour, rework was carried out. Presence or absence of residues on the glass substrate was observed.

○: No adhesive residues on the cut cross-section (No transfer during rework).

Δ: Slight adhesive residues on the cut cross-section (Slight transfer during rework).

x: Prominent adhesive residues on the cut cross-section (Transfer occurred during rework).

(5) Light Leakage (i) In order to evaluate uniformity of the polarizer plate sample, light leakage was observed using a backlight in a dark room. The coated polarizer plate (100×175 mm) was attached to a glass substrate and light leakage was observed visually and using a brightness measuring instrument. The samples were kept under dry, hot condition of 80° C. for 250 hours and under hot/humid condition of 60° C. and R.H. 90% for 250 hours, and then at room temperature for over 1 hour before the measurement.

○: Little non-uniformity, Δ: Slight non-uniformity, x: Prominent non-uniformity (ii) After turning on an LCD device, brightness of a front side of the display panel was measured at a height of 1 m using a brightness measuring instrument. A degree of light leakage was quantitated from a difference of brightness between a center portion and edge portions. The brightness difference ΔL was calculated according to the following Equation 2. A lower ΔL value represents better light leakage characteristics.

$$\Delta L = [(a+b+d+e)/4] - c,$$ [Equation 2]

(As described above, in Equation 2, a, b, d, and e are brightnesses at the edge portions, and c is the brightness at the center portion).

FIG. 1 illustrates a plan view of an LCD device showing measurement points for determining brightness. For each measurement point, brightness was measured for a circle with a radius of about 0.5 cm. As illustrated in FIG. 1, each measurement point for the edge portions was located at a middle of each side of the panel and the measurement circle was tangent to each side.

(6) Storage elasticity (G'): Storage elasticity was measured at room temperature (23° C.) using ARES (TA Instrument) through frequency sweep (strain=5%, normal force=100 N).

(7) Creep: The polarizer plate was attached to a glass substrate with an adhesion area of 1.5×1.5 cm$^2$. After storage at room temperature for 3 days, creep was evaluated by measuring a displacement distance (mm) when a force of 3 kgf was applied to the sample for 15 minutes, using a universal testing machine (UTM).

(8) Durability/reliability: A 100×175 mm polarizer plate coated with the adhesive composition was laminated on a glass substrate and a pressure of 4 to 5 kg/cm$^2$ was applied to prepare a sample. In order to investigate thermal/humidity resistance, the samples were kept at 60° C. and R.H. 90% for 500 hours; and visual inspection was performed to identify foaming or peeling. Thermal resistance was tested after keeping the samples at 80° C. for 500 hours. In both cases, the samples were observed visually or under a microscope after storage at room temperature for over 1 hour.

○: No foaming or peeling, Δ: Slight foaming or peeling, x: Prominent foaming or peeling

TABLE 1

|  |  | Ex. 1 | Ex. 2 | Ex. 3 | Ex. 4 | Comp. Ex. 1 | Comp. Ex. 2 |
|---|---|---|---|---|---|---|---|
| (a) (Meth)acrylate copolymer | | 100 | 100 | 100 | 100 | 100 | 100 |
| (b) Crosslinking agent | (b1) | 0.45 | 0.45 | 0.65 | 1 | 0.1 | 0.8 |
|  | (b2) | 0.15 | 0.15 | 0.20 | 0.6 | 0.15 | — |
| (c) Silane coupling agent | | 0.08 | 0.08 | 0.2 | 0.2 | 0.08 | 0.08 |
| (d) Crosslinking catalyst | | 0.015 | 0.03 | 0.05 | 0.05 | — | 0.05 |
| Gel fraction (%) | | 86 | 88 | 92 | 98 | 62 | 82 |
| Appearance of coating solution (1 day) | | Trans | Trans | Trans | Trans | Trans | Trans |
| Peel strength (gf/25 mm) | | 130.2 | 135.2 | 130.8 | 120.4 | 526.0 | 147.5 |
| Reworkability/cutability | | ○ | ○ | ○ | ○ | x | ○ |
| Light leakage | | ○ | ○ | ○ | ○ | x | Δ |
|  | | ΔL = 0.5 | ΔL = 0.5 | ΔL = 0.5 | ΔL = 0.5 | ΔL = 1.2 | ΔL = 0.7 |
| G' (MPa), 1 Hz | | 0.25 | 0.29 | 0.32 | 0.38 | 0.01 | 0.11 |
| Creep | | 0.185 | 0.146 | 0.115 | 0.098 | 0.183 | 0.164 |
| Reliability | Thermal (85° C.) | ○ | ○ | ○ | ○ | ○ | x |
|  | Thermal/humidity (60° C., 95% RH) | ○ | ○ | ○ | ○ | ○ | Δ |

Trans = transparent

As seen in Table 1, in Examples 1-4, which included the crosslinking catalyst, well-balanced and good physical properties, e.g., peel strength, reworkability, elasticity, creep and reliability, were exhibited. In contrast, in Comparative Example 1, which did not include the crosslinking catalyst and the content of the crosslinking agent was lower than that of the Examples, poor reworkability and unsatisfactory light leakage were exhibited. Additionally, Comparative Example 2, in which the gel fraction was below that of the embodiments, exhibited unsatisfactory light leakage and poor reliability.

By way of summation and review, a polarizer plate may include, e.g., iodine compounds or dichroic polarizing materials aligned in a predetermined direction. Protective films of, e.g., triacetylcellulose (TAC), may be formed on sides of the polarizer plate to protect the polarizer plate. Further, the polarizer plate may include a phase difference film with molecules aligned in one direction and/or a view-angle compensation film, e.g., a liquid crystal film. Each of these films may exhibit different physical properties because they may be made from materials with different molecular structures and compositions. For example, under high-temperature and/or high-humidity conditions, dimensional stability of the polarizer plate may decrease, as the materials with the molecules aligned in one direction contract or expand. Accordingly, if the polarizer plate contracts or expands under the high-temperature and/or high-humidity conditions in the state in which the polarizer plate is fixed by an adhesive, stress may be concentrated at, e.g., the TAC layer, causing birefringence and leakage of light. This may be known as a light leakage phenomenon, which may occur as an optical isotropy of a stretched polarization film is degraded due to film contraction in high-temperature, high-humidity environments.

Reduction of film contraction by increasing a molecular weight of a composition of an adhesive or by increasing a crosslinking density may be considered. In this regard, the embodiments may overcome various defects and reduced durability. Thus, improvement of modulus (i.e., improvement of the crosslinking density) as well as durability may be achieved by using heat curing, and UV curing may not be necessary.

Prevention of light leakage may include a stress relieving scheme and a stress reinforcing scheme.

In this regard, the embodiments may overcome drawbacks associated with contamination of an adherend or reduction in durability over time, which may occur during the stress relieving scheme, e.g., addition of low molecular weight additives. In addition, the embodiments may provide lower brightness at a portion where light leakage occurs and may be regarded as true prevention of light leakage because a light-leaking area may be smaller.

In addition, the embodiments may not exhibit increase in brightness while using reinforced adhesives and may thereby prevent light leakage by increasing elasticity and greatly reducing the light-leaking area.

The embodiments may provide an adhesive sheet curable by thermal curing, rather than UV/EB curing. Thus, drawbacks associated with UV/EB curing, e.g., additional facilities for UV irradiation and poor process characteristics, may be avoided.

The embodiments provide an adhesive composition that prevents deformation of a polarizer plate caused by external environment through construction of a dense matrix by adjusting curing rate of the adhesive, thereby reducing light leakage caused by deformation of the polarizer plate and providing a display device having excellent durability and reworkability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An adhesive composition for a polarizer plate, the adhesive composition comprising:
    about 100 parts by weight of a (meth)acrylate copolymer including about 50 to about 90 wt % of repeating units derived from a $C_{1-20}$ alkyl(meth)acrylate monomer, about 0.01 to about 30 wt % of repeating units derived from an aromatic group-containing monomer, greater than 0 to about 10 wt % of repeating units derived from a hydroxy group-containing monomer, and about 0.01 to about 10 wt % of repeating units derived from a carboxyl group-containing monomer;
    about 0.01 to about 10 parts by weight of a crosslinking agent, the crosslinking agent including a mixture of about 60 to about 90 wt % of an isocyanate crosslinking agent and about 10 to about 40 wt % of an epoxy crosslinking agent;
    about 0.01 to about 5 parts by weight of a silane coupling agent; and
    about 0.01 to about 5 parts by weight of a crosslinking catalyst,
    wherein the adhesive composition provides an adhesive having a gel fraction of about 85% or more as defined by Equation 1:

$$\text{Gel fraction (\%)}=(A/B)\times 100, \quad \text{[Equation 1]}$$

in Equation 1, A is a mass measured after dissolving the adhesive at 23° C. for 48 hours using a solvent and then drying for 24 hours, and B is an initial mass,
    wherein the adhesive composition provides an adhesive having a storage elasticity of about 0.2 to about 0.5 MPa at 23° C., and
    wherein the adhesive composition is thermally curable.

2. The adhesive composition as claimed in claim 1, wherein the aromatic group-containing monomer has positive birefringence.

3. The adhesive composition as claimed in claim 1, wherein the crosslinking catalyst includes an amine compound, an organometallic compound, or a combination thereof.

4. The adhesive composition as claimed in claim 3, wherein:
    the amine compound includes at least one of trimethylaminoethylethanolamine, N,N,N',N'-tetramethylhexanediamine, triethylamine, and imidazole, and
    the organometallic compound includes at least one of cobalt naphthenate, dibutyltin diacetate, dibutyltin diacetylacetonate, tetra-n-butyltin, trimethyltin hydroxide, and dibutyltin dilaurate.

5. The adhesive composition as claimed in claim 1, wherein the epoxy crosslinking agent is included in an amount of 0.15 parts by weight to 0.6 parts by weight.

6. The adhesive composition as claimed in claim 1, wherein the aromatic group-containing monomer includes 2-ethyiphenoxy(meth)acrylate, 2-ethylthiophenyl(meth)acrylate, or phenyl(meth)acrylate.

7. An optical member, comprising:
    an optical film; and
    an adhesive sheet on one or both sides of the optical film, the adhesive sheet being formed from the adhesive composition as claimed in claim 1.

8. The optical member as claimed in claim 7, wherein the optical member has a brightness difference ΔL of about 0.5 or less between edge portions thereof and a center portion thereof, the brightness difference ΔL being defined by the following Equation 2:

$$\Delta L=[(a+b+d+e)/4]-c, \quad \text{[Equation 2]}$$

in Equation 2, a, b, d, and e are brightnesses at the edge portions, and c is a brightness at the center portion.

9. The optical member as claimed in claim 7, wherein the adhesive sheet has a peel strength of 120.4 to 135.2 g/25 mm.

10. An adhesive composition for a polarizer plate, the adhesive composition comprising:
    a (meth)acrylate copolymer including about 50 to about 90 wt % of repeating units derived from a $C_{1-20}$ alkyl(meth)acrylate monomer, about 0.01 to about 30 wt % of repeating units derived from an aromatic group-containing monomer, greater than 0 to about 10 wt % of repeating units derived from a hydroxy group-containing monomer, and about 0.01 to about 10 wt % of repeating units derived from a carboxyl group-containing monomer;

a mixture of an epoxy crosslinking agent and an isocyanate crosslinking agent, the mixture including about 60 to about 90 wt % of the isocyanate crosslinking agent and about 10 to about 40 wt % of the epoxy crosslinking agent;

a silane coupling agent; and a crosslinking catalyst, wherein the adhesive composition provides an adhesive having a gel fraction of about 85% or more as defined by Equation 1:

$$\text{Gel fraction (\%)} = (A/B) \times 100 \qquad \text{[Equation 1]}$$

in Equation 1, A is a mass measured after dissolving the adhesive at 23° C. for 48 hours using a solvent and then drying for 24 hours, and B is an initial mass, wherein the adhesive composition provides an adhesive having a storage elasticity of about 0.2 to about 0.5 MPa at 23° C., and wherein the adhesive composition is thermally curable.

11. The adhesive composition as claimed in claim 10, wherein the adhesive composition includes about 100 parts by weight of the (meth)acrylate copolymer; about 0.01 to about 10 parts by weight of the crosslinking agent; about 0.01 to about 5 parts by weight of the silane coupling agent; and about 0.01 to about 5 parts by weight of the crosslinking catalyst.

12. The adhesive composition as claimed in claim 10, wherein the epoxy crosslinking agent is included in an amount of 0.15 parts by weight to 0.6 parts by weight, based on 100 parts by weight of the (meth)acrylate copolymer.

13. An optical member, comprising:

an optical film; and an adhesive sheet on one or both sides of the optical film, the adhesive sheet being formed from the adhesive composition as claimed in claim 10.

14. The optical member as claimed in claim 13, wherein the optical member has a brightness difference ΔL of about 0.5 or less between edge portions thereof and a center portion thereof, the brightness difference ΔL being defined by the following Equation 2:

$$\Delta L = [(a+b+d+e)/4] - c, \qquad \text{[Equation 2]}$$

in Equation 2, a, b, d, and e are brightnesses at the edge portions, and c is a brightness at the center portion.

15. An optical member, comprising:

an optical film; and an adhesive sheet on one or both sides of the optical film, the adhesive sheet being formed by thermally curing an adhesive composition, wherein the adhesive composition includes:

about 100 parts by weight of a (meth)acrylate copolymer including about 50 to about 90 wt % of repeating units derived from a C1-20 alkyl(meth)acrylate monomer, about 0.01 to about 30 wt % of repeating units derived from an aromatic group-containing monomer, greater than 0 to about 10 wt % of repeating units derived from a hydroxy group-containing monomer, and about 0.01 to about 10 wt % of repeating units derived from a carboxyl group-containing monomer;

about 0.01 to about 10 parts by weight of a crosslinking agent;

about 0.01 to about 5 parts by weight of a silane coupling agent; and about 0.01 to about 5 parts by weight of a crosslinking catalyst, wherein the adhesive composition provides an adhesive having a gel fraction of about 85% or more as defined by Equation 1:

$$\text{Gel fraction(\%)} = (A/B) \times 100, \qquad \text{[Equation 1]}$$

in Equation 1, A is a mass measured after dissolving the adhesive at 23° C. for 48 hours using a solvent and then drying for 24 hours, and B is an initial mass, wherein the crosslinking agent includes a combination of an isocyanate crosslinking agent and an epoxy crosslinking agent, wherein the adhesive composition provides an adhesive having a storage elasticity of about 0.2 to about 0.5 MPa at 23° C., wherein the optical member has a brightness difference ΔL of about 0.5 or less between edge portions thereof and a center portion thereof, the brightness difference ΔL being defined by the following Equation 2:

$$\Delta L = [(a+b+d+e)/4] - c, \qquad \text{[Equation 2]}$$

in Equation 2, a, b, d, and e are brightnesses at the edge portions, and c is a brightness at the center portion.

* * * * *